(12) United States Patent
Chichy

(10) Patent No.: US 9,570,250 B2
(45) Date of Patent: Feb. 14, 2017

(54) GAS INSULATED SWITCHING DEVICE AND CAMERA SYSTEM FOR OPTICAL CHECK OF SWITCHING POSITION IN THE SWITCHING DEVICE

(71) Applicant: ABB Technology AG, Zurich (CH)

(72) Inventor: Siegmund Chichy, Krefeld (DE)

(73) Assignee: ABB SCHWEIZ AG, Baden (CN)

( * ) Notice: Subject to any disclaimer, the term of this patent is extended or adjusted under 35 U.S.C. 154(b) by 0 days.

(21) Appl. No.: 15/011,697

(22) Filed: Feb. 1, 2016

(65) Prior Publication Data

US 2016/0148762 A1    May 26, 2016

Related U.S. Application Data

(63) Continuation of application No. PCT/EP2014/000490, filed on Feb. 25, 2014.

(30) Foreign Application Priority Data

Aug. 2, 2013 (EP) ..................................... 13003867

(51) Int. Cl.
*H01H 1/00* (2006.01)
*H01H 9/02* (2006.01)
(Continued)

(52) U.S. Cl.
CPC .......... *H01H 9/0271* (2013.01); *G06F 1/1628* (2013.01); *H02B 13/0356* (2013.01);
(Continued)

(58) Field of Classification Search
CPC .... H01H 9/0271; G06F 1/1628; H04N 5/2253; H02B 1/306; H02B 13/0356
See application file for complete search history.

(56) References Cited

U.S. PATENT DOCUMENTS 6,501,572 B1    12/2002 Poth et al.
7,498,575 B2 *  3/2009 Huebner ............ G01N 21/3504
                                                    250/338.1
(Continued)

FOREIGN PATENT DOCUMENTS

CA         2274854 A1    6/1998
DE         9312384 U1   10/1993
WO      2007093575 A1    8/2007

*Primary Examiner* — Twyler Haskins
*Assistant Examiner* — Fayez Bhuiyan
(74) *Attorney, Agent, or Firm* — Leydig, Voit & Mayer, Ltd.

(57) ABSTRACT

A gas insulated switching device with a gastight housing, with switching elements mounted in the housing, having an optical window on which an external camera can be positioned outside the housing on a support element in such, that the contacts and/or the contact positions of one or more switches can be displayed by this camera on a display screen, and with a switchable light source, which illuminates the area the camera is focused on to display the contact positions of one or more switches, as well as a camera system having the switching device. For easier and more cost effective use of a camera system, considering that direct optical control of specific switch positions are often not desired, the camera may be portable and/or positionable only temporarily, and the support element and the camera itself are provided with complementary elements for temporarily positioning the portable camera to the support.

9 Claims, 2 Drawing Sheets

(51) Int. Cl.
*H02B 13/035* (2006.01)
*G06F 1/16* (2006.01)
*H04N 5/225* (2006.01)
*H02B 1/30* (2006.01)

(52) U.S. Cl.
CPC ... *H04N 5/2253* (2013.01); *H01H 2001/0021* (2013.01); *H01H 2009/0292* (2013.01); *H02B 1/306* (2013.01)

(56) References Cited

U.S. PATENT DOCUMENTS

| | | | |
|---|---|---|---|
| 9,019,108 B2* | 4/2015 | Chillar | F01K 13/003 340/500 |
| 9,097,182 B2* | 8/2015 | Chillar | F01D 17/085 |
| 2008/0105524 A1* | 5/2008 | Olszewski | H01H 1/0015 200/312 |
| 2015/0296146 A1* | 10/2015 | Scanlon | H04N 5/247 348/82 |

* cited by examiner

GAS INSULATED SWITCHING DEVICE AND CAMERA SYSTEM FOR OPTICAL CHECK OF SWITCHING POSITION IN THE SWITCHING DEVICE

CROSS-REFERENCE TO RELATED APPLICATIONS

This application is a bypass continuation of International Application No. PCT/EP2014/000490, filed on Feb. 25, 2014, claiming benefit to European Patent Application No. 13 003 867.2, filed on Aug. 2, 2013, the entire disclosure of each of which is incorporated by reference herein. The International Application was published in English on Feb. 5, 2015, as WO 2015/014416 A1 under PCT Article 21(2).

FIELD

The invention relates to a gas insulated switching device with a gas-tight housing.

BACKGROUND

A switchgear with a camera system adapted to the switchgear housing, in order to make the position of the internal of the switches visable, is shown in CA 2 274 854 C. In this state of the art, the camera is fixed directly to the housing of switchgear, in order to be a fixed installed part of the switchgear. The resulting disadvantage is, that for each switchgear panel a separate camera is need.

SUMMARY

An aspect of the invention provides gas insulated switching device, comprising: a gastight housing; a switching unit, mounted in the gastight housing; an optical window, configured such that an external camera can be positioned outside the gastight housing on a support element; and a switchable light source, configured to illuminate at least an area of the external camera, wherein contacts and/or contact positions of one or more switches can be displayed by the external camera on a display screen, wherein the switchable light source is configured to display the contact positions of the one or more switches, wherein the external camera is a portable camera which is positionable only temporarily, and wherein the support element and the camera include complementary units configured to temporarily position the portable camera to the support element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
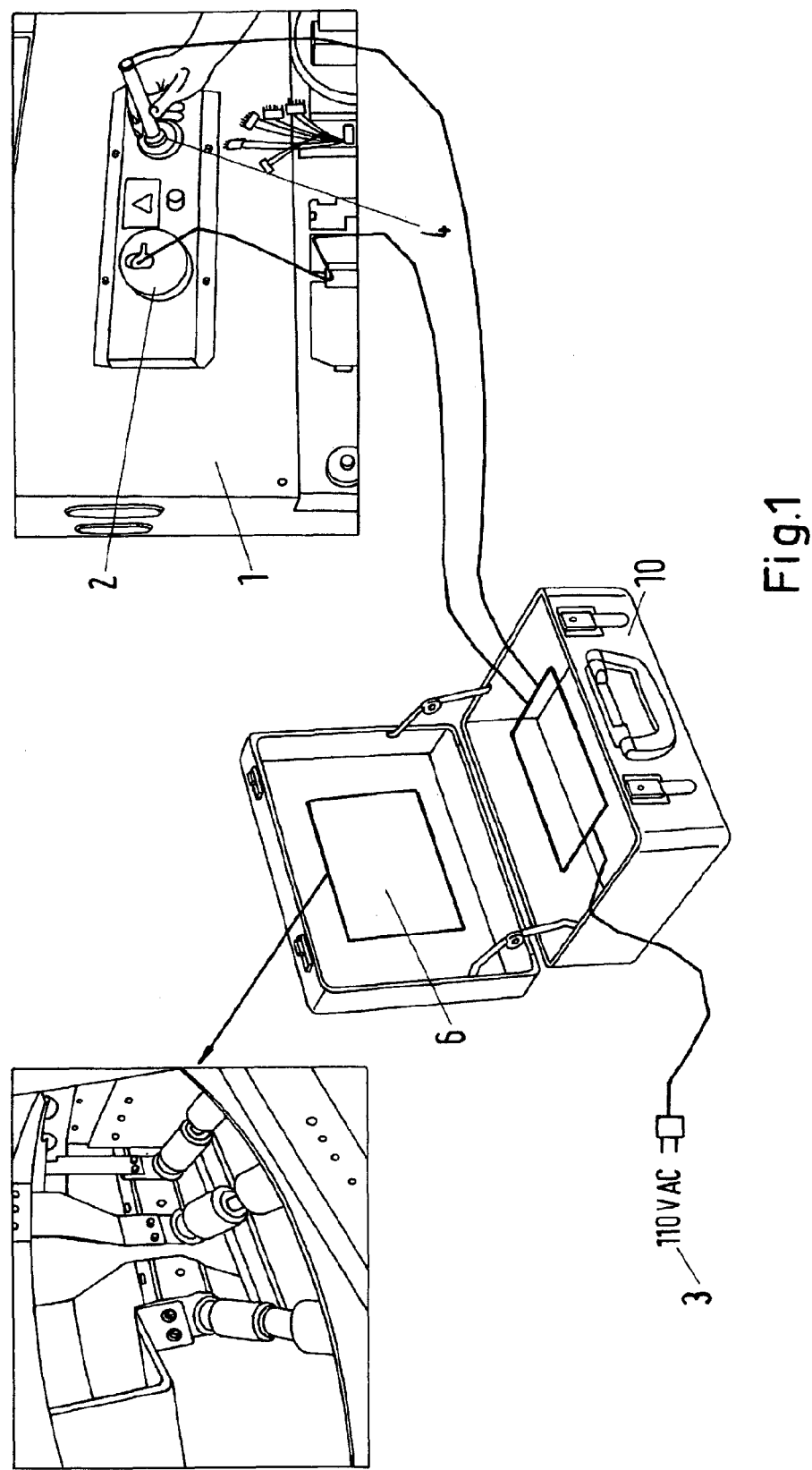
FIG. 1 shows a camera system in use at a medium voltage switchgear housing.

An aspect of the invention provides a gas insulated switching device with a gastight housing, wherein switching means are mounted in the housing, provided with an optical window on which an external camera can be positioned outside the housing on a support element in such, that the contacts and/or the contact positions of a switch or of switches can be displayed by this camera on a display screen, and with a switchable light source, which illuminates the aforesaid area the camera is focused on to display the contact positions of a switch or switches. A camera system including this switching device is also provided.

An aspect of the invention uses a camera system in a easier and cost effective way, considering that direct optical control of specific switch positions are not often desired.

An aspect of the invention is that the camera is a portable camera which is positionable only temporarily, and the support element as well as the camera itself are provided with complementary means for the temporarily positioning of the portable camera to the support. "Temporarily" means for the time, when the observation of the contact position is required.

So important for certain aspects the invention is that the camera is not a part of the switchgear, but separated from that. So with that, in difference to the mentioned state of the art, one single camera can be used for several switch gears, because it is portable.

In a further embodiment, the support element and the camera are provided with complementary magnetic elements, in such, that the portable camera can be attached to the support temporarily in the aforesaid optically centered, precalibrated optical and mechanical position, in order to make the contacts and/or the contact positions of the switch or of the switches visible on a display screen. "Optically centered" includes also the meaning focused to the elements which are important to observe, like the contact pieces, or indicating elements of the contact pieces fixed to the contact piece, by which the contact position can be observed.

In an advantageous embodiment, the complementary support elements on the support of the switching device housing are magnetic rings or elements, with interacting mechanical guiding pins and holes for a temporarily and centered predetermined reproducible positioning of the portable camera in the aforesaid position.

The support element is provided as an adapter element, with magnetic elements near its periphery, and with a centering ring for the camera lens adaption.

In an alternative also advantageous embodiment, the complementary support elements on the support of the switching device housing are bayonet cap elements, for a temporarily and centered predetermined reproducible positioning of the portable camera in the aforesaid position.

To the invention concerns directly a camera system for temporarily adaption to a gas-insulated switching device or a switchgear panel.

The camera is a portable camera which can be temporarily attached to a support element of a switchgear housing of the panel.

In a further advantageous embodiment, the camera system also includes or is connectable to a portable display.

So the portable observation system consist of camera, display, light source, power supply, cables and an transport box for this equipment.

In a final embodiment the portable camera system is transported in a carrying case, and that the display is mounted directly in the carrying case.

By this, only one camera system is need for several switchgear panels.

FIG. 1 shows a housing of a gas insulated medium voltage switchgear 1, with defined windows in the housing, where the light source 4 as well as the camera 2 can be attached temporarily, that means when needed for a sure observation of the switching contacts position of the disconnector or grounding switch inside the switchgear housing.

Figure 2:
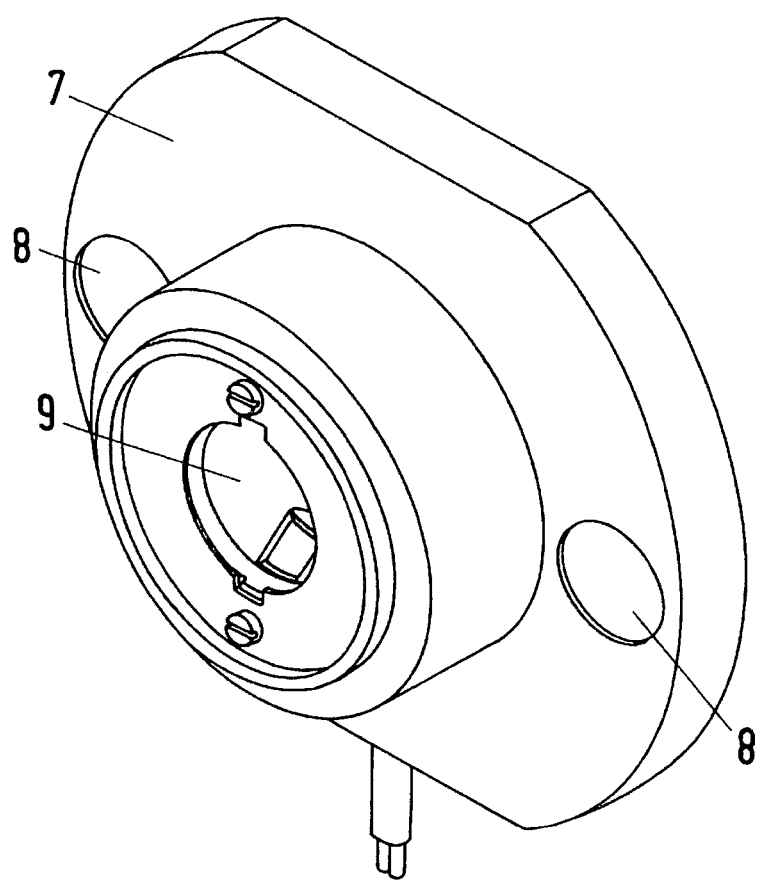
FIG. 2 shows an adapter.

Therefore an attachable adapter 7, like also shown in FIG. 2, for the light source 4 as well as a further attachable adapter for the camera 2 can be fixed temporarily by magnetic means. The contours of each adapter and each window are provided complementary, so that the camera and the light source can be attached in a self-adjusting way, in order to be focused to the contact positions which have to displayed. Both, camera and light source are attachable externally to the housing. Camera and light source are not a fixed part of the switchgear housing of the panel, but interchangeable and therefore portable.

So the camera 2 and the light source 4 can be attached to the windows of the switchgear housing 1. Light source 4 and camera 2 are electrically connected with a power source which is implemented for example in the portable case 10, where also the display 6 is located. Camera and light source are activated by the electronic means inside the case 10. The display 6 is integrated into the upper part of the openable case 10.

The case is inside in such a way portioned, that also the portable camera and the portable light can be transported after the use. So the complete system includes also the aforesaid case, in order to have fully transportable system.

FIG. 2 shows the adapter 7. This adapter 7 is provided with magnet elements near the periphery, on order to attach this adapter as a support for the light source, in this case for example LED-elements 9 integrated into the inner opening of the adapter 7.

For the camera 2, the adapter 7 is the same, except of the integrated light source. This adapter is the aforesaid support for the camera.

As fixation means are here used magnetic elements 8, but also fixation means by bayonet-elements are possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A gas insulated switching device, comprising:
a gastight housing;
a switching unit, mounted in the gastight housing;
an optical window, configured such that an external camera can be positioned outside the gastight housing on a support element; and
a switchable light source, configured to illuminate at least an area of the external camera,
wherein contacts and/or contact positions of one or more switches can be displayed by the external camera on a display screen,
wherein the switchable light source is configured to display the contact positions of the one or more switches,
wherein the external camera is a portable camera which is positionable only temporarily, and
wherein the support element and the camera include complementary units configured to temporarily position the portable camera to the support element.

2. The device of claim 1, wherein the complementary units are complementary magnetic elements, such that the portable camera can be attached to the support element temporarily in an optically centered, precalibrated optical and mechanical position, in order to make the contacts and/or the contact positions of the one or more switches visible on a display screen.

3. The device of claim 2, wherein the complementary unit on the support element of the gastight housing includes a magnetic ring, element, or two or more of these, including interacting mechanical guiding pins and holes for a temporarily and centered predetermined reproducible positioning of the portable camera in the optically centered, precalibrated optical and mechanical position.

4. The device of claim 1, wherein the support element for the camera and a light source support element are present as an adapter element, each including magnetic elements near its periphery, and each including a centering ring for camera lens adaption.

5. The device of claim 2, wherein the complementary units on the support element of the switching device housing are bayonet cap elements, configured for a temporarily and centered predetermined reproducible positioning of the portable camera in the optically centered, precalibrated optical and mechanical position.

6. The device of claim 1, wherein the light source is implemented in a separate adapter which is also portable and can be attached to a window in the gastight housing of the switchgear.

7. A camera system adapted for optical check of switching position in the device of claim 1, wherein the camera is a portable camera which can be temporarily attached to a support element of a switchgear housing or panel.

8. The system of claim 7, further comprising a portable display.

9. The system of claim 8, wherein the camera system and/or the light source is transportable in a carrying case, and
wherein the display is mounted directly in the carrying case.

* * * * *